(12) United States Patent
Kim et al.

(10) Patent No.: US 9,590,817 B2
(45) Date of Patent: *Mar. 7, 2017

(54) LOGICAL NETWORK GENERATION USING PRIMARY GATEWAY CREDENTIALS

(71) Applicant: Belkin International, Inc., Playa Vista, CA (US)

(72) Inventors: Ryan Yong Kim, Rolling Hills Estates, CA (US); Venkata Subba Rao Pathuri, Alpharetta, GA (US); David Shao, Gardena, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 14/242,731

(22) Filed: Apr. 1, 2014

(65) Prior Publication Data

US 2015/0280994 A1 Oct. 1, 2015

(51) Int. Cl.
*H04L 29/06* (2006.01)
*H04L 12/28* (2006.01)
*H04L 29/12* (2006.01)

(52) U.S. Cl.
CPC ........ *H04L 12/2809* (2013.01); *H04L 61/103* (2013.01); *H04L 61/2038* (2013.01); *H04L 61/6022* (2013.01); *H04L 63/062* (2013.01); *H04L 29/12113* (2013.01); *H04L 63/0876* (2013.01); *H04L 2012/285* (2013.01); *H04L 2012/2841* (2013.01)

(58) Field of Classification Search
CPC ..... H04L 12/66; H04L 65/102; H04L 67/146; H04W 12/00; H04W 8/245
See application file for complete search history.

(56) References Cited

U.S. PATENT DOCUMENTS

| 7,515,549 B2 | 4/2009 | Wing et al. |
| 2002/0111698 A1* | 8/2002 | Graziano ............... G05B 15/02 700/17 |

(Continued)

OTHER PUBLICATIONS

Giacalone Predictive Systems S: "The Gateway Response Protocol (GRP) for Networks Using Zero Configuration IPv4 Addresses: draft-giacalone-grp-00.txt," Feb. 1, 2000.

(Continued)

*Primary Examiner* — Barbara Burgess
(74) *Attorney, Agent, or Firm* — Kilpatrick Townsend & Stockton LLP

(57) ABSTRACT

Techniques for identifying a primary gateway and generating a logical network using credentials of the primary gateway are provided. For example, a method, computing device, or computer-program product may include transmitting a query, wherein the query includes a request for identifying a primary gateway in a local area network, and receiving a response to the query, wherein the response includes an identifier associated with the primary gateway. Further, the method, computing device, or computer-program product may include transmitting credentials of the primary gateway, wherein the credentials are used to associate the computing device with a logical network in the local area network, and receiving a network identifier, wherein the network identifier is associated with the logical network in the local area network.

20 Claims, 8 Drawing Sheets

(56) References Cited

U.S. PATENT DOCUMENTS

| | | | |
|---|---|---|---|
| 2003/0158967 A1* | 8/2003 | Tripathi | H04L 29/12113 709/245 |
| 2006/0036847 A1 | 2/2006 | Bush et al. | |
| 2008/0151916 A1* | 6/2008 | Jetcheva | H04L 45/124 370/401 |
| 2010/0235433 A1* | 9/2010 | Ansari | G06Q 30/04 709/203 |
| 2013/0198825 A1* | 8/2013 | Feytons | H04L 63/0876 726/6 |
| 2014/0247941 A1* | 9/2014 | Gu | H04L 63/062 380/270 |

OTHER PUBLICATIONS

International Search Report and Written Opinion issued Jun. 10, 2015, in International Application No. PCT/US2015/023350, 11 pages.

\* cited by examiner

LOGICAL NETWORK GENERATION USING PRIMARY GATEWAY CREDENTIALS

FIELD

The present disclosure relates to generation of logical networks within physical networks, such as a local area network. Specifically, various techniques and systems are provided for identifying a primary gateway and generating a logical network using credentials of the primary gateway.

BACKGROUND

Multiple gateways may be present within a local area network. For example, a user's home local area network may include a router and a range extender. One of the gateways may be designated as a primary gateway that provides wide area network access to the local area network. Network devices that provide various functionalities may also be present within the local area network. For example, a home automation network device may provide a user with the ability to remotely configure or control one or more appliances within the user's home.

Each network device within the local area network may be paired with a gateway in the local area network. A network device may be given a network profile based on the gateway with which the network device is connected. Each network profile may be associated with a different logical network (e.g., having a unique network identifier). Accordingly, multiple logical networks having different network identifiers may be generated and associated with the network devices due to the existence of multiple gateways. A user may only be able to connect to one logical network at a time, and thus the existence of multiple logical networks may prevent a user from accessing all of the network devices within the local area network.

BRIEF SUMMARY

Techniques are described for identifying a primary gateway and generating a logical network using credentials of the primary gateway. For example, a computing device (e.g., a network device) may query a local area network to determine which gateway is a primary gateway for the local area network. The primary gateway may generate a response and the response may be received by the computing device. The response may include an identifier of the primary gateway. The computing device may then send credentials of the primary gateway to a server for generating a logical network for the local area network.

In some examples, the computing device may submit a query to a first gateway with which the computing device is paired. The first gateway may determine, based on the query, whether it is the gateway that is being queried by the computing device. In the event the first gateway is the primary gateway, the first gateway will return a response with an identifier of the first gateway. In the event the first gateway is not the primary gateway, the first gateway may forward the query to a second gateway with which the first gateway is connected. The second gateway may then determine whether it is the gateway that is being queried. In the event the second gateway is the primary gateway, the second gateway may generate a response with an identifier of the second gateway. The second gateway may send the response to the first gateway, and the first gateway may then forward the response to the computing device. The identifier of the first and/or second gateway may include a media access control (MAC) address of the first and/or second gateway.

In some embodiments, the query may include identification information of the primary gateway. For example, the query may include an Internet Protocol (IP) address of the primary gateway. In some embodiments, the query may provide the IP address to a gateway and may ask the gateway whether it is the primary gateway. For example, the query may provide the IP address to a gateway and the gateway may compare its IP address to the IP address in the query. Based on the comparison, the gateway may determine whether it is the primary gateway. Once it is determined that the gateway is the primary gateway, the gateway may generate a response with an identifier (e.g., a MAC address of the gateway, or the like) and may return the response to the computing device. In some embodiments, the query may include an address resolution protocol command that may include the identification information.

In some embodiments, the query may include a reflection service request. For example, the computing device may transmit the query to a server located in a network that is external to the local area network (e.g., a cloud network). The server may provide a reflection service and may determine an identifier (e.g., one or more MAC addresses, or the like) of the gateway that forwarded the query to the server. The server may return a response to the computing device indicating an identifier of the gateway that forwarded the query to the server. The identifier may include an external network identifier of the gateway, such as a Wide Area Network (WAN)-side MAC address or MAC/IP address combination. The computing device may determine that the gateway is the primary gateway for the local area network due to the gateway's contact with the external network.

Once the computing device receives the response generated by the primary gateway and/or returned from the server, the computing device may send credentials of the primary gateway to a server. In various embodiments, the server may be the same or different from the server providing the reflection service. In some embodiments, the server may generate a logical network associated with the primary gateway and may register the computing device with the logical network. In the event that a logical network has been previously generated for the primary gateway (e.g., when registering another computing device), the server may register the computing device with the logical network. Using the above described techniques, a single logical network may be associated with all network devices in the local area network regardless of the gateway with which the network devices are paired. Accordingly, the above described techniques may be used to prevent the generation of multiple logical networks in the local area network.

According to at least one example, a computer-implemented method may be provided that includes transmitting, on a computing device, a query, wherein the query includes a request for identifying a primary gateway in a local area network, and receiving a response to the query, wherein the response includes an identifier associated with the primary gateway. The method may further include transmitting credentials of the primary gateway, wherein the credentials are used to associate the computing device with a logical network in the local area network. The method may further include receiving a network identifier, wherein the network identifier is associated with the logical network in the local area network.

In some embodiments, a computing device may be provided that includes one or more data processors. The computing device may further include a non-transitory computer-readable storage medium containing instructions which when executed on the one or more data processors, cause the one or more processors to perform operations including: transmitting a query, wherein the query includes a request for identifying a primary gateway in a local area network; receiving a response to the query, wherein the response includes an identifier associated with the primary gateway; transmitting credentials of the primary gateway, wherein the credentials are used to associate the computing device with a logical network in the local area network; and receiving a network identifier, wherein the network identifier is associated with the logical network in the local area network.

In some embodiments, a computer-program product tangibly embodied in a non-transitory machine-readable storage medium of a first network device may be provided. The computer-program product may include instructions configured to cause one or more data processors to: transmit a query, wherein the query includes a request for identifying a primary gateway in a local area network; receive a response to the query, wherein the response includes an identifier associated with the primary gateway; transmit credentials of the primary gateway, wherein the credentials are used to associate the computing device with a logical network in the local area network; and receive a network identifier, wherein the network identifier is associated with the logical network in the local area network.

In some embodiments, the method, computing device, and computer-program product described above may further include wherein, when the query is transmitted to the primary gateway, the response is received from the primary gateway. In some embodiments, the method may further include wherein, when the query is transmitted to a gateway that is not the primary gateway, the query is forwarded to the primary gateway and the response is generated by the primary gateway.

In some embodiments, the query includes an address resolution protocol command. In some embodiments, the address resolution protocol command includes an Internet protocol address of the primary gateway.

In some embodiments, the identifier associated with the primary gateway includes a media access control address of the primary gateway.

In some embodiments, the query includes a reflection service request.

In some embodiments, a primary gateway includes a gateway that provides the local area network with access to a wide area network. In some embodiments, the credentials of the primary gateway include a service set identification and a media access control address of the primary gateway. In some embodiments, the local area network includes a home automation network.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
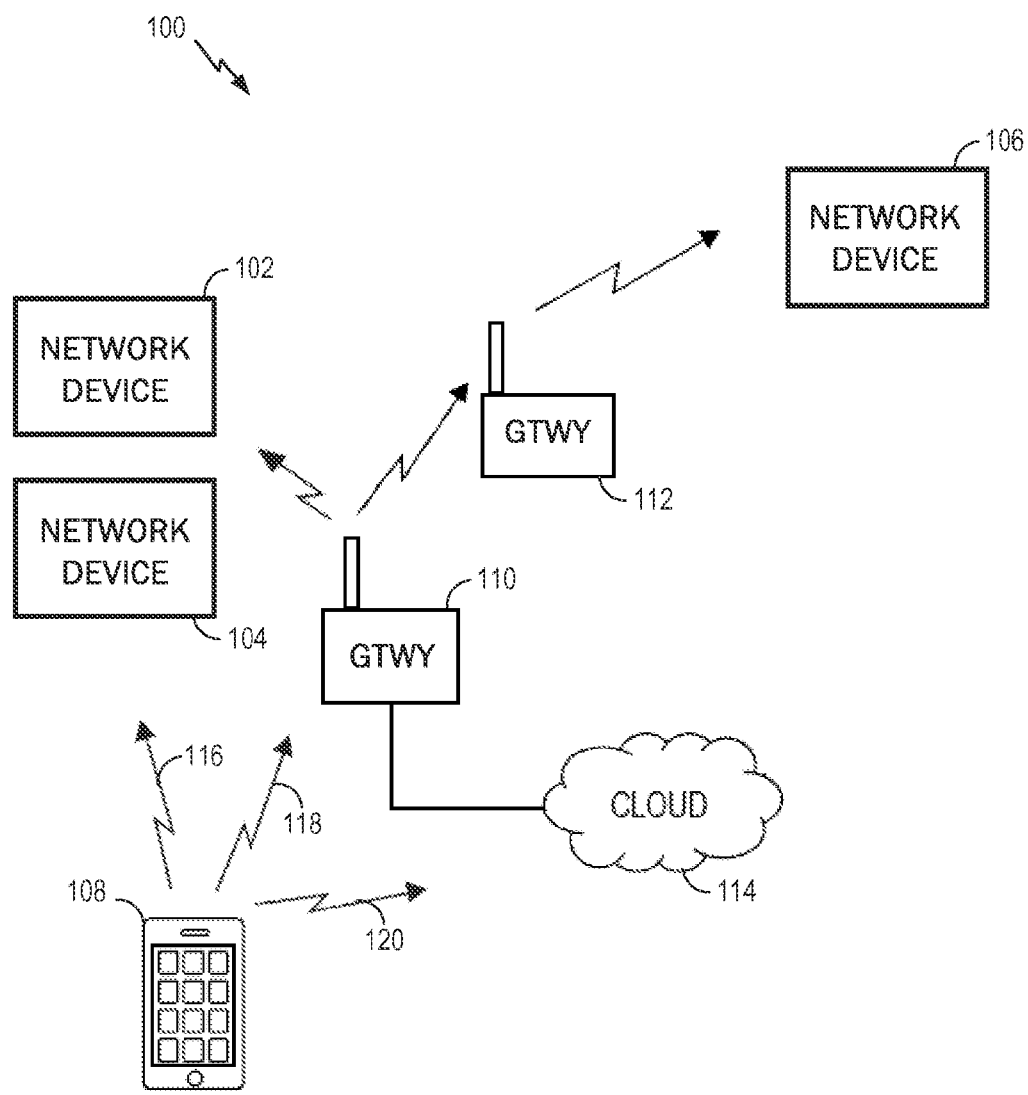
FIG. 1 is an illustration of an example of a wireless network environment in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A local area network may be set up to provide a user with access to various devices within the network. For example, a home automation network may include one or more network devices that provide a user with the ability to remotely configure or control one or more appliances within the user's home. The local area network may include one or more gateways that provide the user with access to the network devices. The one or more gateways may also provide the user and the network devices with access to one or more external networks, such as a cloud network, the Internet, and/or other wide area networks. One or more gateways in the local area network may be designated as a primary gateway that provides the local area network with access to an external network.

It is desirable for a user to be able to access the network devices (e.g., using a mobile device) while located within the local area network and also while located remotely from the local area network. As explained herein, techniques are provided that allow generation of a single logical network in a local area network, thus preventing multiple logical networks from being associated with the local area network. These techniques allow a user, whether located locally or remotely from the local area network, to access all network devices in the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, the mobile device may be authenticated based on the mobile device's authentication with the logical network. For example, if the mobile device has authorized access to the logical network (e.g., a WiFi network provided by a gateway), the network devices paired with that logical network may allow the mobile device to connect to them without requiring a login. Accordingly, only users of mobile devices that have authorization to access the logical network are authorized to access network devices within the logical network, and these users are authorized without having to provide login credentials for the network devices.

An accountless authentication process may also be performed when the user is remote so that the user can access network devices within the logical network without having to enter network device login credentials. While remote, the user may access the network devices in the local area network using an external network, such as a cloud network and/or the Internet. The primary gateway may provide the network devices in the local area network with access to the external network. To allow accountless authentication, a cloud network server may provide a network ID and/or one or more keys to a network device and to a mobile device (e.g., running an application, program, or the like). In some cases, a unique key may be generated for the network device and a separate unique key may be generated for the mobile device. The keys may be specifically encrypted with unique information identifiable only to the network device and the mobile device. The network device and the mobile device may be authenticated using the network ID and/or each device's corresponding key each time the network device or mobile device attempts to access the cloud network server.

In some embodiments, a home wireless local area network may include a single gateway, such as a router. A network device within the local area network may pair with or connect to the gateway and may obtain credentials from the gateway. For example, when the network device is powered on, a list of gateways that are detected by the network device may be displayed on a mobile device (e.g., via an application, program, or the like installed on and executed by the mobile device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The mobile device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send to the server information relating to the network device (e.g., MAC address, serial number, or the like) and/or information relating to the mobile device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the mobile device. The server may associate the network device and the mobile device with the logical network by storing the network ID and the set of security keys in a record or profile. The cloud network server may then transmit the network ID and the set of security keys to the network device. The network device may store the network ID and its unique security key. The network device may also send the network ID and the mobile device's unique security key to the mobile device. The network device and the mobile device may then communicate with the cloud server using the network ID and the unique key generated for each device. Accordingly, the user may remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the mobile device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the mobile device for use in accessing the second network device on the second logical network. The server may associate the first network device and the mobile device with the first logical network by storing the first network ID and the first set of security keys in a first record or profile. The server may also associate the second network device and the mobile device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the mobile device's unique security key to the mobile device. The network devices and the mobile device may then communicate with the cloud server using the respective network ID and the unique key generated for each device.

Accordingly, when multiple gateways are included in the home local area network, multiple logical networks associated with different network identifiers may be generated for the local area network. When the mobile device is located within range of both gateways in the local area network, there is no problem accessing both network devices due to the ability of the mobile device to perform local discovery techniques (e.g., universal plug and play (UPnP)). However, when the user is located remotely from the local area network, the mobile device may only be associated with one logical network at a time, which prevents the mobile device from accessing network devices of other logical networks within the local area network.

Accordingly, techniques and systems are described herein for identifying a primary gateway and generating a logical network using credentials of the primary gateway. Accordingly, a single logical network may be generated for a local area network. Whether located locally or remotely, a user may thus access all network devices in the local area network using the single logical network.

FIG. 1 illustrates an example of a wireless local area network 100. The local area network 100 includes network device 102, network device 104, and network device 106. In some embodiments, the network devices 102, 104, 106 may include home automation network devices that allow a user to access, control, and/or configure various home appliances located within the user's home, such as a television, radio, light, microwave, iron, and/or the like. For example, network device 102 may include a home automation switch that may be coupled with a home appliance.

A user may wirelessly communicate with the network devices 102, 104, 106 using mobile device 108. The mobile device 108 may include a cellular telephone, a smartphone, a laptop computer, a tablet, a personal digital assistant (PDA), a computing device, wearable devices (e.g., a smart watch, or the like), or any other mobile device having wireless connection capability. While only a single mobile device 108 is shown in FIG. 1, one of ordinary skill in the art will appreciate that multiple mobile devices may connect with the network devices 102, 104, 106. The user may interact with the network devices 102, 104, or 106 using an application, a web browser, a proprietary program, or any other program executed and operated by the mobile device 108. In some embodiments, the mobile device 108 may communicate directly with the network devices 102, 104, 106 (e.g., communication signal 116). In some embodiments, the mobile device 108 may communicate with the network devices 102, 104, 106 via the gateways 110, 112 (e.g., communication signal 118) and/or the cloud network 114 (e.g., communication signal 120).

The local area network 100 further includes gateway 110 and gateway 112. Gateway 110 or 112 can be utilized for providing communication capabilities to network devices 102, 104, 106 and/or mobile device 108 via radio signals in order to provide communication, location, and/or other services to the devices. While two gateways 110 and 112 are shown in FIG. 1, one of ordinary skill in the art will appreciate that any number of gateways may be present within the local area network 100. The wireless network provided by gateway 110 and gateway 112 may be any type of network familiar to those skilled in the art that can support data communications using any of a variety of commercially-available protocols. For example, gateways 110, 112 may provide wireless communication capabilities for the wireless local area network 100 using particular communications protocols, such as WiFi (e.g., IEEE 802.11 family standards, or other mobile communication technologies, or any combination thereof). Using the communications protocol(s), the gateways 110, 112 may transmit and receive radio frequencies with which wireless enabled devices in local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extender, and/or any other device that provides wireless network access among one or more computing devices and/or external networks. For example, gateway 110 may include a router and gateway 112 may include a range extender.

The gateways 110 and 112 may also provide the mobile device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the mobile device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
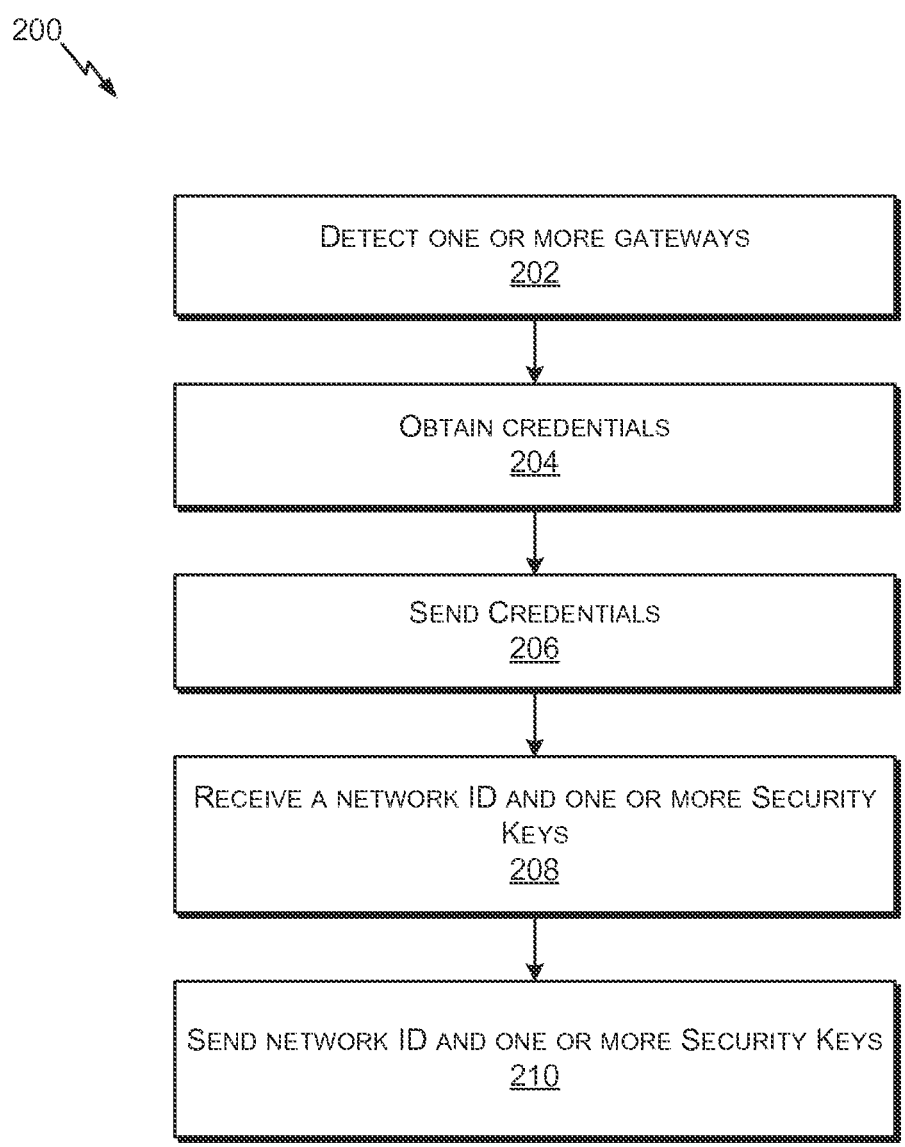
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by a mobile device. During the provisioning process, the mobile device may directly communicate with the network device. In some embodiments, direct communication between network devices 102, 104, 106 and mobile device 108 may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and mobile device with a server, such as a server located within the cloud network 114. For example, upon being powered on or reset to factory settings, the network device may send or broadcast identification information to one or more mobile devices. The identification information may be sent during a discovery process. For example, the identification information may be sent in response to a discovery request from a mobile device. In some cases, the identification information may include a name of the network device.

An application, program, or the like that is installed on and executed by the mobile device may receive the identification information from the network device. When the application on the mobile device is launched by a user, the mobile device may display the identification information for selection by the user. Once the network device identification information is selected, the mobile device may send a signal to the network device indicating that it has been selected. The network device may then send to the mobile device a list of gateways that are detected by the network device. The mobile device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The mobile device may then prompt the user to enter login information that is required for accessing the network signals provided by the gateway. For example, the login information may be the same information that was originally set up to access the gateway network signals (e.g., when the gateway was initially installed). The mobile device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 214). For example, the mobile device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later points in time, network devices 104 and 106 may obtain credentials from gateways 110 and 112, respectively. In some embodiments, the credentials may include a SSID of the wireless local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which they are paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, or the like) and/or information relating to the mobile device (e.g., MAC address, serial number, application unique identifier, or the like) to the server. In some embodiments, the communication of the credentials from the network device to the cloud network server may be a Hypertext Transfer Protocol (HTTP), a Hypertext Transfer Protocol Secure (HTTPS) communication, a secure Transmission Control Protocol (TCP) communication, or the like. One of ordinary skill in the art will appreciate that other communication mechanisms may be used to communicate between the network device and the cloud network server.

Once the credentials are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the mobile device. For example, the server may generate a unique key for the network device 102 and a separate unique key for the mobile device 108.

In some embodiments, as previously described, network device 104 may also be paired with gateway 110 at the same or a later point in time as the network device 102. During registration of the network device 104, the server may determine that the mobile device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the mobile device 108 when registering the gateway 110 as the first logical network.

The gateway 112 may also be registered by the server as a second logical network with a second network ID. A second set of security keys may be generated for the network device 106 and the mobile device 108. For example, the server may generate a unique security key for the network device 106 and a unique security key for the mobile device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the mobile device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the mobile devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for a mobile device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the mobile device 108 when registering the first logical network. The network device 104 may then receive and store the first network ID and the security keys from the server.

At 210, the network device may send the network ID and the set of security keys to the mobile device. For example, the network device 102 may send to the mobile device 108 the first network ID and the unique security key generated for the mobile device 108. The network device 102 and the mobile device 108 may then communicate with the cloud network server using the first network ID and each device's unique key. In some embodiments, the network device and the mobile device may generate a signature using their respective security key. The signature is sent to the cloud network server along with a communication from the network device or mobile device. The cloud network server may then process the signature in order to authenticate each device, as described below. The network device and mobile device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

A mobile device may also generate a signature using its uniquely generated security key. For example, the mobile device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of mobile device that is used and the type of values that may be accessed and/or generated by the type of mobile device. In some cases, one type of mobile device may not allow an application to access a unique identifier of the mobile device (e.g., a serial number, UUID, or the like). In such cases, the SDU UniqueId value may include a value generated by an application or program installed on and executed on the mobile device that is used to access the network device. The value may be unique to the application or program that generated the value. In other cases, another type of mobile device may allow an application to access a unique identifier of the mobile device. In such cases, the SDU UniqueId value may include a value that is unique to the mobile device itself, such as a serial number, UUID, or the like. In this example, the mobile device may retrieve the unique value from storage within the mobile device. One of ordinary skill in the art will appreciate that other unique identifiers may be used to uniquely identify the mobile device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the mobile device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the mobile device's unique identifier. The ExpirationTime term may indicate the period of time for which the signature is valid, similar to that above for the signature generated by the network device.

The mobile device may place the signature in a data packet and may transmit the data packet to the cloud network server with a communication signal. The network device may also place the network ID in the data packet. The signature and the network ID, if included, may be used by the cloud network server to verify that the mobile device is associated with the logical network and authorized to communicate with one or more network devices associated with the logical network. In some embodiments, a signature is provided with each communication sent from the mobile device to the server. The cloud server may receive the signature and may generate a signature using the same expression as that used by the mobile device. For example, the server may retrieve the mobile device's key and other relevant information from storage and generate the signature using the key and the other information using the expression described above. The server then verifies whether the signatures match. Upon determining that the signatures match, the server authenticates the mobile device and allows it to communicate with one or more of the network devices associated with logical network.

Once the provisioning process is completed, the mobile device 108 may access the network device 102 locally via the gateway 110 (e.g., communication signal 118) or remotely via the cloud network 114 (e.g., communication signal 120). In some embodiments, the communication between the mobile device 108 and the cloud network 114 may be a HTTP or HTTPS communication. One of ordinary skill in the art will appreciate that other communication mechanisms may be used to communicate between the mobile device 108 and the cloud network 114.

As previously described, the mobile device, when located within range of the local area network, may be authenticated using accountless authentication that is based on the mobile device's authentication with the logical network. For example, if the mobile device has authorized access to the logical network (e.g., a WiFi network provided by a gateway), the network devices paired with that logical network may allow the mobile device to connect with them without requiring a network device login. Accordingly, the network device may perform accountless authentication of mobile devices that have authorization to access the logical network without requiring a user to provide login credentials for the network devices. While located remotely, the mobile device may also be authenticated to access the network devices via the cloud network using an accountless authentication process. For example, the network ID and the mobile device's unique security key may be used to allow the mobile device to communicate with the network devices via the cloud network (e.g., by generating a signature as described above).

When the mobile device 108 is located within range of both gateways 110, 112 in the local area network 100, the mobile device 108 does not encounter any issues when attempting to access any of the network devices 102, 104, 106. For example, the mobile device 108 may perform UPnP discovery and may list all if the network devices 102, 104, 106 that have responded to the discovery request regardless of which network ID the network devices 102, 104, 106 have. Accordingly, the existence of the first and second logical networks with first and second network IDs does not lead to any issues when the mobile device 108 is located within the local area network 100. However, when the user is located remotely, the mobile device 108 may only be associated with one logical network at a time. For example, the mobile device 108, while located remotely from the local area network 100, may query the cloud server with a known network ID (e.g., the first or second network ID). In response, the server will only return the network devices associated with that network ID. As a result, the user will not be able to see all network devices within the user's local area network 100.

Figure 3:
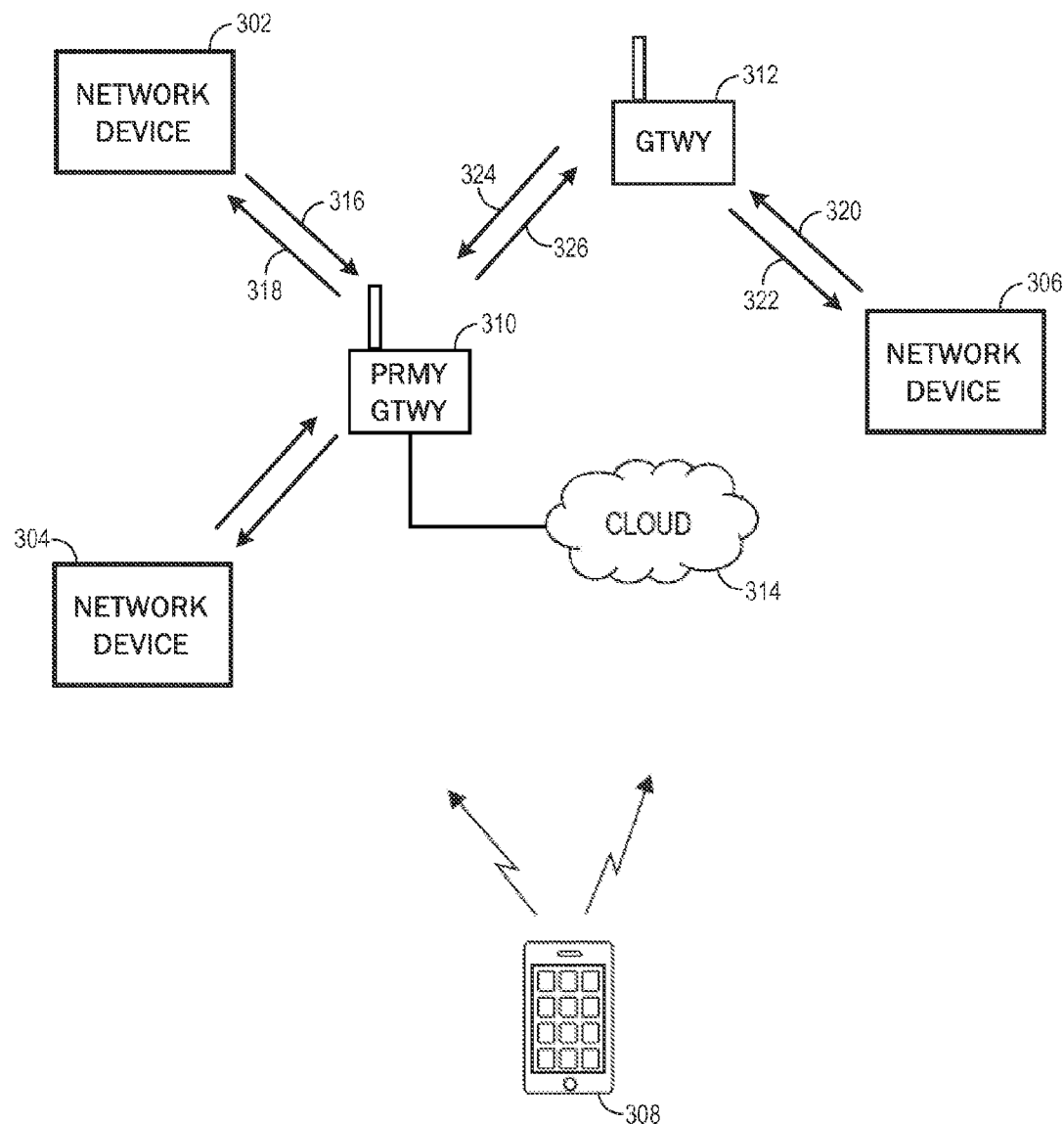
FIG. 3 is an illustration of an example of a wireless network environment in accordance with some embodiments.
Figure 4:
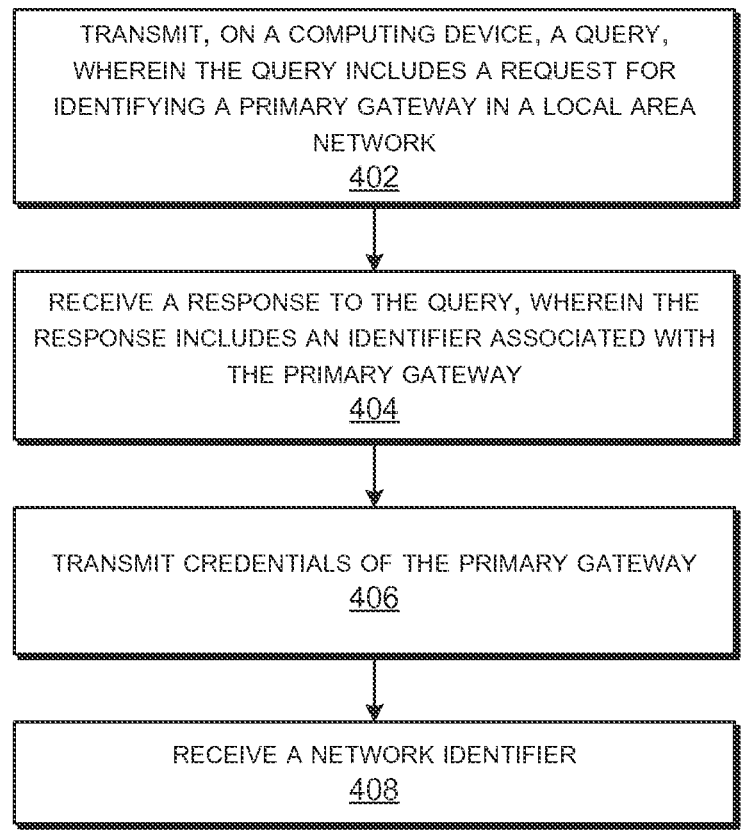
FIG. 4 is a flowchart illustrating an embodiment of a process for identifying a primary gateway, in accordance with some embodiments.

FIGS. 3-4 provide systems and techniques for identifying a primary gateway and generating a logical network using credentials of the primary gateway. Using the credentials of a single gateway ensures that a single logical network will be generated for the local area network regardless of the number of gateways present in the local area network. Accordingly, all network devices in the local area network will be associated with the logical network regardless of the gateway with which the network devices are paired.

FIG. 3 illustrates an example of a wireless local area network 300. Similar to the local area network 100 described above, the local area network 300 includes network devices 302, 304, 306, mobile device 308, gateways 310, 312, and cloud network 314. It should be appreciated that the local area network 300 may have other components than those depicted. Further, the embodiment shown in the figure is only one example of a local area network that may incorporate an embodiment of the invention. In some other embodiments, local area network 300 may have more or fewer components than shown in the figure, may combine two or more components, or may have a different configuration or arrangement of components.

In some embodiments, the network devices 302, 304, 306 may include home automation network devices that allow a user to access, control, and/or configure various home appliances located within the user's home, such as those described above with respect to FIG. 1. For example, network device 302 may include a home automation switch that may be coupled with a home appliance.

Mobile device 308 may be utilized by a user to wirelessly communicate with the network devices 302, 304, 306. The mobile device 308 may include a cellular telephone, a smartphone, a laptop computer, a tablet, a personal digital assistant (PDA), a computing device, wearable devices (e.g., a smart watch, or the like), or any other mobile device having wireless connection capability. While only a single mobile device 308 is shown in FIG. 3, one of ordinary skill in the art will appreciate that multiple mobile devices may connect with the network devices 302, 304, 306. The user may interact with the network devices 302, 304, or 306 using an application, a web browser, a proprietary program, or any other program executed and operated by the mobile device 308. In some embodiments, the mobile device 308 may communicate directly with the network devices 302, 304, 306. In some embodiments, the mobile device 308 may communicate with the network devices 302, 304, 306 via the gateways 310, 312 and/or the cloud network 314.

Gateway 310 or 312 may provide communication capabilities to network devices 302, 304, 306 and mobile device 308 via radio signals in order to provide communication, location, and/or other services to the devices. While two gateways 310 and 312 are shown in FIG. 3, one of ordinary skill in the art will appreciate that any number of gateways may be present within the local area network 300. The wireless network provided by gateway 310 and gateway 312 may be any type of network familiar to those skilled in the art that can support data communications using any of a variety of commercially-available protocols. For example, gateways 310, 312 may provide wireless communication capabilities for the wireless local area network 300 using particular communications protocols, such as WiFi (e.g., IEEE 802.11 family standards, or other mobile communication technologies, or any combination thereof). Using the communications protocol(s), the gateways 310, 312 may transmit and receive radio frequencies with which wireless enabled devices in local area network 300 can communicate. The gateways 310, 312 may include a router, a modem, a range extender, and/or any other device that provides wireless network access among one or more computing devices and/or external networks. For example, gateway 310 may include a router and gateway 312 may include a range extender.

The gateways 310 and 312 may also provide the mobile device 308 and the network devices 302, 304, 306 with access to one or more external networks, such as the cloud network 314, the Internet, and/or other wide area networks. The cloud network 314 may be similar to the cloud network 114 described with respect to FIG. 1.

Gateway 310 is connected to and provides the local area network 300 with access to the cloud network 314, and thus is designated as the primary gateway. In some embodiments, the primary gateway 310 provides gateway functionality and also registration services (e.g., Dynamic Host Configuration Protocol (DHCP), Internet Protocol (IP), or the like) to the local area network 300. For example, the primary gateway 310 may distribute network configuration parameters, such as IP addresses, to devices that are part of the local area network 300 (e.g., network devices 302, 304, 306, gateway 312, mobile device 308, and/or any other devices that belong to the network 300).

Any device connecting to the local area network 300 is assigned a unique IP address with which to communicate and be identified. In some embodiments, each device may use a protocol (e.g., DHCP protocol, or the like) to request an IP address and any other networking parameters from the primary gateway 310. For example, when a device connects to the local area network 300, the device may broadcast (e.g., using DHCP client program, code, or the like) a request for the necessary information. The gateway 310 may manage a pool of IP addresses and other information in order to prevent more than one device from receiving the same information. Upon receiving a request from a device, the primary gateway 310 may respond with an IP address and other information in a registration response, such as one or more DHCP packets. Other information that the primary gateway 310 may provide to a device in a registration response may include the IP address of the primary gateway 310, the subnet mask, the lease duration of the device's IP address, host commands that may be used to find a route to the primary gateway, and/or any other information needed for the device to operate on the local area network 300. Various other optional information may be received by the device, such as domain name server (DNS) information, time server information, or the like. The primary gateway 310 may utilize various methods of allocating IP addresses and other configuration parameters, such as a dynamic allocation, automatic allocation, or static allocation.

As described above with respect to FIG. 2, gateway credentials are used to generate a logical network, and also to associate network devices and mobile devices with the logical network. A network device may obtain the credentials from a gateway in response to a prompt from a mobile device to register with a network (e.g., an external network, such as a cloud network). The credentials may include a unique identifier associated with the gateway. For example, a MAC address may be used due to the unique nature of MAC addresses. As previously noted, a device receives the IP address of the primary gateway when the device connects to a local area network. For example, network devices 302, 304, 306 may obtain the IP address of primary gateway 310 upon being connected to the local area network 300 (e.g., from a registration response). However, a network device may not be aware of the MAC address of the primary gateway 310. For example, upon connecting to the local area network 300, a network device may obtain a registration response from the primary gateway that includes the IP address of the primary gateway (e.g., a DHCP response, or the like). However, the registration response may not include a MAC address. Accordingly, techniques may be used to determine the MAC address of the primary gateway, for example, using the IP address of the primary gateway.

In some embodiments, a network device 302, 304, 306 may query the local area network 300 to determine which gateway 310 or 312 is the primary gateway for the local area network 300 and to obtain the unique identifier of the primary gateway. The query may include identification information of the primary gateway. For example, the query may include the primary gateway IP address that was previously received by the network device 302, 304, or 306 when connecting to the local area network 300. In some cases, the query may include an address resolution protocol (ARP) command that may include the identification information. In some embodiments, a network device 302, 304, or 306 may provide the query with the IP address to the gateway 310 or 312 with which the network device 302, 304, or 306 is connected. The query may inquire the gateway as to whether it is the primary gateway. For example, the query may provide the IP address to a gateway 310 or 312 and the gateway 310 or 312 may compare its IP address to the IP address in the query. Based on the comparison, the gateway 310 or 312 may determine whether it is the primary gateway. In the event the gateway that receives the query is not the primary gateway, the gateway may forward the query to a next upstream gateway. The query may be forwarded until the primary gateway receives the query and confirms that it is the primary gateway.

In one example, network device 302 may obtain the IP address of the primary gateway 310 upon joining the local area network 300. During a provisioning process, the network device 302 may be paired with gateway 310, similarly to the provisioning process described above with respect to FIG. 2. After being paired with gateway 310, the network device 302 may transmit a query signal 316 to the gateway 310. For example, a mobile device 308 (e.g., via an application, program, or the like) may instruct the network device 302 to register with the cloud network 314 and, in response, the network device 302 may transmit the query signal 316 to the gateway 310. In some embodiments, the query signal 316 may include an ARP command that can be used to discover the MAC address of any IP enabled device on the local area network 300. The query signal 316 may include the IP address of the primary gateway. The gateway 310 may compare its stored IP address with the IP address included in the query signal 316. Because the gateway 310 is the primary gateway for the local area network 300, the gateway 310 will determine that a match occurs between the IP addresses. In response, the gateway 310 may transmit a response signal 318 to the network device 302. The response signal 318 may include a unique identifier associated with the gateway 310, such as its MAC address. The network device 302 may then transmit credentials of the gateway 310 to a server in the cloud network 314. The gateway 310 credentials may include the MAC address and a SSID of the gateway 310. A similar process may occur after network device 304 is paired with gateway 310.

In another example, network device 306 may obtain the primary gateway 310 IP address upon joining the local area network 300. The network device 306 may be paired with gateway 312 during a provisioning process, similarly to the provisioning process described above with respect to FIG. 2. Once paired with the gateway 312, the network device 306 may transmit a query signal 320 to the gateway 312. For example, mobile device 308 (e.g., via an application, program, or the like) may instruct the network device 306 to register with the cloud network 314 and, in response, the network device 306 may transmit the query signal 320 to the gateway 312. In some cases, the query signal 320 may include an ARP command that can be used to discover the MAC address of any IP enabled device on the local area network 300. The query signal 320 may include the IP address of the primary gateway. The gateway 312 may then compare its stored IP address with the IP address included in the query signal 320. The gateway 312 may determine that the IP addresses do not match and thus that it is not the primary gateway. In response to determining the mismatch, the gateway 312 may forward the query to the next upstream gateway 310 via query signal 324. Upon receiving the query signal 324, the gateway 310 may compare its IP address to the IP address in the query signal 324, and, based on the comparison, may determine that it is the primary gateway. Once the gateway 310 determines that it is the primary gateway, the gateway 310 may generate a response with its unique identifier and may return the response to the gateway 312 via response signal 326. The gateway 312 may then forward the response to the network device 306 via response signal 322. The response signals 326 and 322 may include a unique identifier associated with the gateway 312, such as its MAC address. The network device 306 may then transmit credentials of the gateway 312 to the server in the cloud network 314. The gateway 312 credentials may include the MAC address and a SSID of the gateway 312.

As previously noted, the query may include an ARP command that can be used to discover the MAC address of any IP enabled device on the local area network 300. The ARP command may be used to allow dynamic distribution of information needed to translate an address in a first protocol to an address in a second protocol. For example, an ARP command may be used to convert an IP address of a network device to a local network address, such as a MAC address. The conversion may be done by exchanging among devices on network (e.g., network devices, gateways, or the like) one or more address resolution packets and one or more address resolution response packets that include mappings or correspondences between the first protocol and the second protocol. The queries and responses described above may include one or more of these packets. Further details relating to ARP commands are described in "An Ethernet Address Resolution Protocol—or—Converting Network Protocol Addresses to 48.bit Ethernet Address for Transmission on Ethernet Hardware," Network Working Group Request For Comments 826, November 1982, which is hereby incorporated by reference in its entirety.

In some embodiments, a network device 302, 304, 306 may query the cloud network 314 to determine which gateway 310 or 312 is the primary gateway for the local area network 300 and to obtain the unique identifier of the primary gateway. The query may include a reflection service request. For example, the network device 302, 304, 306 may transmit the query to a server located in the cloud network 314 or in another external network. The server may provide a reflection service and may determine a unique identifier (e.g., one or more MAC addresses, or the like) of the gateway 310 that forwarded the query to the server. The server may return a response to the network device 302, 304, 306 indicating an identifier of the gateway 310. The identifier may include an external network identifier of the gateway 310, such as a Wide Area Network (WAN)-side MAC address or MAC/IP address combination. The network device 302, 304, 306 may determine that the gateway 310 is the primary gateway for the local area network 300 due to the gateway's 310 contact with the cloud network 314 or other external network. Once the network device 302, 304, 306 receives the response with the primary gateway 310 identifier from the server in the cloud network 314 or other external network, the network device 302, 304, 306 may send credentials of the primary gateway 310 to the server in the cloud network 314. In various embodiments, the server may be the same or different from the server providing the reflection service.

As explained in more detail below with respect to FIG. 4, the cloud network 314 server may generate a logical network associated with the primary gateway 312 and may register the network device 302, 304, and/or 306 with the logical network. In the event that a logical network has been previously generated for the primary gateway (e.g., when registering another network device 302, 304, or 306), the server may register the computing device with the logical network. Using the above described techniques, a single logical network may be associated with all network devices in the local area network regardless of the gateway with which the network devices are paired.

FIG. 4 illustrates an embodiment of a process 400 for identifying a primary gateway and providing credentials of the primary gateway for registration of a logical network and/or a computing device. In some aspects, the process 400 may be performed by a computing device, such as a network device 102, 104, or 106 shown in FIG. 1 and/or by network device 302, 304, or 306 shown in FIG. 3. Process 400 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

At 402, the process 400 includes transmitting, on a computing device, a query. The query includes a request for identifying a primary gateway in a local area network. The local area network may include a home automation network. The primary gateway may include a gateway that provides the local area network with access to an external network, such as a wide area network, a cloud network, or the like. The primary gateway may also provide registration services to the local area network, such as DHCP or IP registration services. In some examples, a network device (e.g., network device 302, 304, or 306) may obtain an IP address of the primary gateway upon joining the local area network and may be paired with either the primary gateway or a different gateway on the local area network during a provisioning process, similarly to the provisioning process described above with respect to FIG. 2. Once paired with a gateway, the network device may transmit the query to the gateway with which the network device is paired. For example, a mobile device (e.g., via an application, program, or the like) may instruct the network device to register with the external network and, in response, the network device may transmit the query signal in order to determine the identification of the primary gateway.

In some examples, the query includes an address resolution protocol command. The address resolution protocol command may be used to discover the MAC address of any IP enabled device on the local area network. The query may include an Internet Protocol (IP) address of the primary gateway. For example, address resolution protocol command may include an IP address of the primary gateway. In some embodiments, the query may provide the IP address to the gateway and may ask the gateway whether it is the primary gateway. The gateway may compare its IP address to the IP address in the query. Based on the comparison, the gateway may determine whether it is the primary gateway. In other examples, the query may include a reflection service request. For example, the reflection service request may be transmitted to a server located in a cloud network or other external network.

At 404, the process 400 includes receiving a response to the query. The response includes an identifier associated with the primary gateway. The identifier associated with the primary gateway may include a media access control (MAC) address of the primary gateway. In some embodiments, when the query is transmitted to the primary gateway, the response is received from the primary gateway. For example, the computing device may be paired with the primary gateway, similar to network device 302 being paired with gateway 310 as illustrated in FIG. 3. As a result, the primary gateway will receive the query from the computing device and determine that its IP address matches the IP address included in the query. The primary gateway will then send the response directly to the computing device.

In some embodiments, when the query is transmitted to a gateway that is not the primary gateway, the query is forwarded to the primary gateway and the response is generated by the primary gateway. For example, the computing device may be paired with a gateway in the local area network other than the primary gateway, similar to network device 306 being paired with gateway 312 as illustrated in FIG. 3. In this example, the computing device transmits the query to the gateway with which it is paired, and the gateway forwards the query to the next upstream gateway. The query is forwarded by each gateway in the local area network until the query reaches the primary gateway. For example, gateway 312 may forward the query to gateway 310 using query signal 324. Once the primary gateway receives the query, it will determine that its IP address matches the IP address included in the query. The primary gateway may then generate the response and send the response to the closest downstream gateway. The response will be forwarded to each next downstream gateway until it reaches the gateway with which the computing device is paired. The gateway will then send the response to the computing device. For example, the gateway 310 may generate the response and may send the response to gateway 312 via response signal 326. The gateway 312 may then forward the response to network device 306 via response signal 322.

In some embodiments, when the query includes a reflection service request transmitted to a server located in a cloud network or other external network, the response is generated by the server. The server may provide a reflection service and may determine a unique identifier (e.g., one or more MAC addresses, or the like) of the primary gateway that forwarded the query to the server. The server may generate the response and send the response to the computing device indicating an identifier of the gateway. The computing device may determine that the gateway is the primary gateway for the local area network due to the gateway's contact with the cloud network or other external network.

At 406, the process 400 includes transmitting credentials of the primary gateway. The credentials of the primary gateway may be transmitted to a server in a cloud network. For example, network device 306 may transmit credentials obtained from gateway 310 to a server in cloud network 314. As described in more detail below, the credentials may be used to generate a logical network for the local area network if a logical network has not already been created for the primary gateway in the local area network. The credentials may also be used to associate the computing device with the logical network, as explained in more detail below. The credentials of the primary gateway may include a service set identification and the MAC address of the primary gateway. As previously described, after pairing with a gateway, the computing device may transmit the query and, in response, may receive the MAC address of the primary gateway. In some embodiments, the other credentials, including the service set identification, may also be received from the primary gateway in response to the query. In some embodiments, the computing device may transmit a separate signal from the query in order to obtain one or more of the credentials other than the MAC address.

In some embodiments, the computing device may also send to the server information relating to the computing device (e.g., MAC address, serial number, or the like) and/or information relating to the mobile device (e.g., MAC address, serial number, application unique identifier, or the like). In some embodiments, the communication of the credentials from the computing device to the server may be a Hypertext Transfer Protocol (HTTP), a Hypertext Transfer Protocol Secure (HTTPS) communication, a secure Transmission Control Protocol (TCP) communication, or the like. One of ordinary skill in the art will appreciate that other communication mechanisms may be used to communicate between the network device and the cloud network server.

Once the credentials are received by the server, the server may register the primary gateway as a logical network within the local area network and may generate a network identifier (ID) for the logical network. For example, the server may register the gateway 310 as the logical network. During the registration process, the server may generate the network ID for identifying the logical network. The network ID may include a unique number or alphanumeric string generated sequentially or randomly, similar to that described above with respect to FIG. 2. The server may further generate a first set of security keys for authenticating the computing device and the mobile device. For example, the server may generate a unique key for the network device 306 and a separate unique key for the mobile device 308. Each time a new network device and/or mobile device are introduced to and registered with the logical network, a new set of security keys may be generated. As previously described, each set of keys generated for the network devices and mobile devices may be generated using database specific technique. For example, a MySQL technique may be used to generate the sets of keys. Each key may include a universally unique identifier (UUID) or a globally unique identifier (GUID).

A record or profile may then be created for associating the network ID with the credentials of the primary gateway, the corresponding network device(s), and the mobile device. For example, the server of the cloud network 314 may associate the network ID with the credentials of the primary gateway 310. In some embodiments, the server performs the association by generating and storing a record including the network ID, the sets of security keys for the different network devices and mobile devices, the gateway credentials, the network devices associated with the network ID (e.g., MAC address or serial number of a network device), the mobile devices associated with the network ID (e.g., MAC address, serial number, application unique identifier, or the like), and/or any other information relevant to the network devices and/or gateways. For example, the server may store the network ID and the first set of security keys in a record at a particular memory space (e.g., in Flash, DRAM, a database, or the like) along with the SSID and MAC address for gateway 310, an identifier of the network devices 302, 304, and/or 306, an identifier of the mobile device 308. In some embodiments, an example of a network device identifier may include a MAC address of the network device, a serial number of the network device, or any other unique identifier. In some embodiments, an example of a mobile device identifier may include a MAC address of the mobile device, a serial number of the mobile device, a unique identifier of an application running on the mobile device, or any other unique identifier.

At 408, the process 400 includes receiving a network identifier, the network identifier being associated with the logical network in the local area network. For example, the computing device may receive the network identifier (ID) from the server in the cloud network. The computing device may also receive the first set of security keys generated for the computing device and mobile device. In one example, once the server has generated a record or profile associating the network device 306 with the logical network generated for the local area network using the credentials of primary gateway 310, the server may transmit the network ID and the first set of security keys to the network device 306. The network device 306 may store the network ID and one or more keys of the first set of keys. For example, the network device 306 may store the unique security key that was created by the server for the network device 306.

The computing device may then send the network ID and one or more keys of the first set of security keys to the mobile device. For example, the network device 306 may send to the mobile device 308 the network ID and the unique security key generated for the mobile device 308. The network device 306 and the mobile device 308 may then communicate with the cloud network 314 server using the network ID and each device's unique key. In some embodiments, the network device and the mobile device may generate a signature using their respective security key. For example, the network device and mobile device may generate a signature using the Authorization attributes described above with respect to FIG. 2. The signature is sent to the cloud network server along with a communication from the network device or mobile device. The cloud network server may then process the signature in order to authenticate each device.

For example, the network device and/or mobile device may place a generated signature in a data packet and may transmit the data packet to the cloud network server in a communication signal. The network device and/or mobile device may also place the network ID in the data packet. The signature and the network ID, if included, may be used by the cloud network server to verify that the network device and/or mobile device is associated with the logical network. In the case of the signature generated by the mobile device, the server may also use the mobile device signature to verify that the mobile device is authorized to communicate with one or more network devices associated with the logical network. In some embodiments, a signature is provided with each communication sent from the network device and/or mobile device to the server. Once the signature is received by the server, the server generates a signature using the same expression as that used by the network device and/or mobile device. In one example, the server may retrieve the network device's key and other relevant information from storage, and may generate the signature using the key and the other information using the Authorization expression described above with respect to the network device in FIG. 2. In another example, the server may retrieve the mobile device's key and other relevant information from storage, and may generate the signature using the key and the other information using the Authorization expression described above with respect to the mobile device in FIG. 2. The server then verifies whether the signatures match. Upon determining that the signatures match, the server authenticates the communication from the network device and/or mobile device.

Once the provisioning and registration process is completed, and the mobile device receives the unique key and the network ID for the logical network, the mobile device may access the computing device locally via a gateway or remotely via the cloud network. In some embodiments, the communication between the mobile device and the cloud network may be a HTTP or HTTPS communication. One of ordinary skill in the art will appreciate that other communication mechanisms may be used to communicate between the mobile device and the cloud network.

By using the credentials of a primary gateway on the local area network to generate a logical network and register devices with the logical network, each network device and mobile device connecting to the local area network will be registered using the same credentials, including the unique identifier of the primary gateway. Thus, a single network ID will be generated and distributed to each network device and mobile device on the local area network. Further, the above described techniques prevent the generation of multiple logical networks in the local area network due to the presence of different gateways. As a result, a user will be able to access all network devices within the user's local area network when attempting to locally or remotely access the network devices.

Figure 5A:
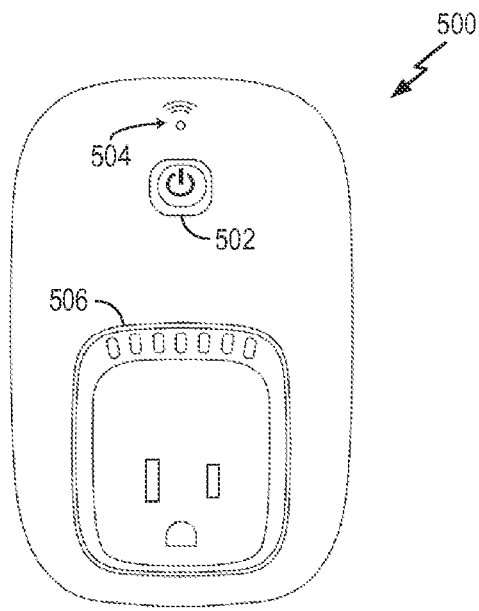
FIG. 5A is an illustration of an example of a front view of a network device in accordance with an embodiment.
Figure 5B:
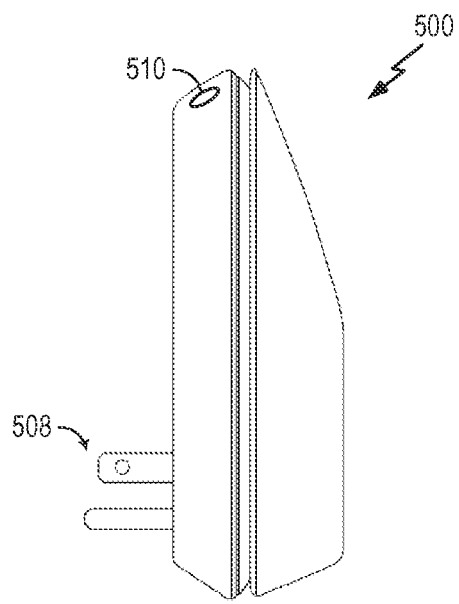
FIG. 5B is an illustration of an example of a side view of a network device in accordance with an embodiment.

FIG. 5A illustrates an example of a front view of a network device 500 and FIG. 5B illustrates an example of a side view of the network device 500. The network device may include any of the network devices 102, 104, or 106 described herein. In some embodiments, the network device 500 may be a home automation network device. For example, the network device 500 may include a home automation switch that may be coupled with a home appliance. A user may wirelessly access the network device 500 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 500 may include a WiFi enabled switch that connects home appliances and other electronic devices to a compatible 802.11b/g/n WiFi network. The network device 500 may thus allow users to locally or remotely turn devices on or off from anywhere, program customized notifications, and/or change device status. The network device 500 may further allow a user to create custom schedules or have devices respond to sunrise or sunset.

The network device 500 includes an power switch 502 that may be depressed in order to turn the network device 500 on and off. In some embodiments, a light source may be integrated with or located behind the power switch. For example, a light-emitting diode (LED) may be located on a circuit board under the power button 502. The light source may be illuminated when the network device 500 is powered on, and may not be illuminated when the network device 500 is powered off.

The network device 500 further includes a communications signal indicator 504. The signal indicator 504 may indicate whether the network device 500 has access to a communications signal, such as a WiFi signal. For example, the signal indicator 504 may include a light source (e.g., a LED) that illuminates when the network device 500 is connected to a communications signal. The light source may depict different colors or other characteristics (e.g., flashing, dimming, or the like) to indicate different levels of signal strength or mode of operation.

The network device 500 includes a restore button 510. The restore button 510 may allow a user to reset the network device 500 to factory default settings. For example, upon being depressed, the restore button 510 may cause all software on the device to be reset to the settings that the network device 500 included when purchased from the manufacturer.

The network device 500 further includes a plug 508 and an outlet 506. The plug 508 allows the network device 500 to be plugged into a wall socket, such as a socket providing 120V, 220V, or the like. In turn, an appliance may be plugged into the outlet 506. Once the network device 500 is registered according to the techniques described above, an appliance plugged into the socket 506 may be controlled by a user using a mobile device (e.g., mobile device 108).

Figure 6:
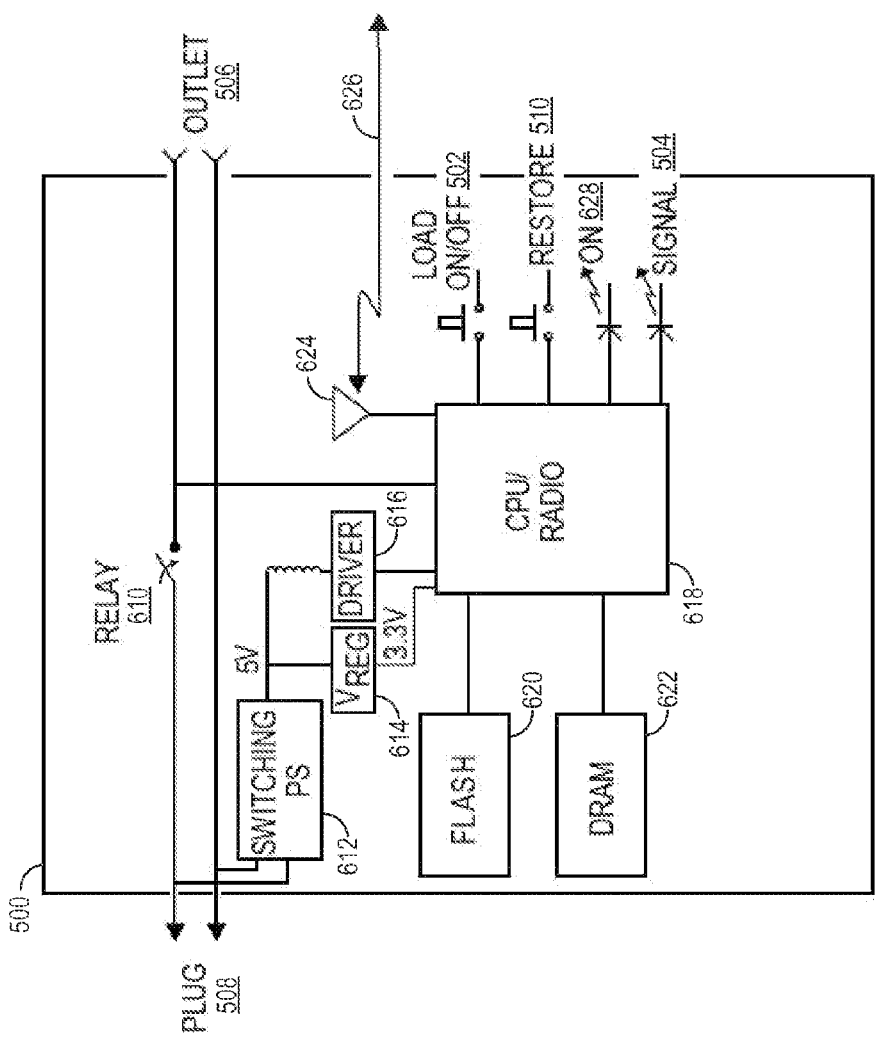
FIG. 6 is an example of a block diagram of a network device, in accordance with an embodiment.

FIG. 6 is an example of a block diagram of the network device 500 depicting different hardware and/or software components of the network device 500. As described above with respect to FIG. 5, the network device 500 includes the outlet 506, the plug 508, the power button 502, the restore button 510, and the communications signal indicator 504. The network device 500 also includes light source 628 associated with the power button 502. As previously described, the light source 628 may be illuminated when the network device 500 is powered on.

The network device 500 further includes a relay 610. The relay 610 is a switch that controls whether power is relayed from the plug 508 to the outlet 506. The relay 610 may be controlled either manually using the power button 502 or remotes using wireless communication signals. For example, when the power button 502 is in an ON position, the relay 610 may be closed so that power is relayed from the plug 508 to the outlet 506. When the power button 502 is in an OFF position, the relay 610 may be opened so that current is unable to flow from the plug 508 to the outlet 506. As another example, an application or program running on a mobile device may transmit a signal that causes the relay 610 to be opened or closed. For instance, a mobile application may display a graphical interface on the mobile device that includes a power button. The user may tap or otherwise select the power button, and the mobile application may send a communication signal (e.g., over a WiFi network) to the network device 500 instructing the network device 500 to open or close the relay 610.

The network device 500 further includes flash memory 620 and dynamic random access memory (DRAM) 622. The flash memory 620 may be used to store instructions or code relating to an operating system, one or more applications, and any firmware. The flash memory 620 may include nonvolatile memory so that any firmware or other program can be can updated. In the event the network device 500 loses power, information stored in the flash memory 620 may be retained. The DRAM 622 may store various other types of information needed to run the network device 500, such as all runtime instructions or code.

The network device 500 further includes a CPU/Radio 618. The CPU/Radio 618 controls the operations of the network device 500. For example, the CPU/Radio 618 may execute various applications or programs stored in the flash memory 620 and/or the dynamic random access memory (DRAM) 622. The CPU/Radio 618 may also receive input from the various hardware and software components, interpret the input, and perform one or more functions in response to the input. As one example, the CPU/Radio 618 may determine whether the power button 502 has been pressed, and determines whether the relay 610 needs to be opened or closed. The CPU/Radio 618 may further perform all communications functions in order to allow the network device 500 to communicate with other network devices, one or more gateways, a cloud network, and/or one or more mobile devices. The network device 500 may communicate with other devices and/or networks via antenna 624. For example, antenna 624 may include a 2.4 GHz antenna that can transmit and receive WiFi communications signals. The antenna 624 may include other types of antennas that can communicate Bluetooth® signals, Zigbee® signals, Ultra-Wideband (UWB) signals, and/or the like. In some embodiments, the network device 500 may include multiple antennas for communicating different types of communication signals.

The network device 500 further includes a driver 616, a switching power supply 612, and a voltage regulator 614. The driver 616 may include instructions or code that can be used to translate control signals or commands received from applications running on the DRAM 622 to commands that the various hardware components in the network device 500 can understand. In some embodiments, the driver 616 may include an ambient application running on the DRAM 622. The switching power supply 612 may be used to transfer power from the outlet in which the plug 508 is connected to the various loads of the network device 500 (e.g., CPU/Radio 618). The switching power supply 612 may efficiently convert the voltage and current characteristics of the electrical power to a level that is appropriate for the components of the network device 500. For example, the switching power supply 612 may perform AC-DC conversion. In some embodiments, the switching power supply 612 may be used to control the power that is relayed from the plug 508 to the outlet 506. The voltage regulator 614 may be used to convert the voltage output from the switching power supply 612 to a lower voltage usable by the CPU/Radio 618. For example, the voltage regulator 614 may regulate the DC voltage from 5V to 3.3V.

In various embodiments, functions may be stored as one or more computer-program products, such as instructions or code, in a non-transitory machine-readable storage medium, such as the flash memory 620 and/or the DRAM 622. The network device 500 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 2 and 4, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2 and 4. The memory, such as the flash memory 620 and/or the DRAM 622, may be a processor-readable memory and/or a computer-readable memory that stores software code (programming code, instructions, etc.) configured to cause a processor(s) within the CPU/Radio 618 to perform the functions described. In other embodiments, one or more of the functions described may be performed in hardware.

A set of these instructions and/or code might be stored on a non-transitory machine-readable storage medium, such as the flash memory 620 and/or the DRAM 622. In some cases, the storage medium might be incorporated within a computer system, such as the CPU/Radio 618. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 500 and/or might take the form of source and/or installable code, which, upon compilation and/or installation on the network device 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other mobile or computing devices such as network input/output devices may be employed.

It should be appreciated that the network device 500 may have other components than those depicted in FIGS. 5 and 6. Further, the embodiment shown in the figures are only one example of a network device that may incorporate an embodiment of the invention. In some other embodiments, network device 500 may have more or fewer components than shown in the figure, may combine two or more components, or may have a different configuration or arrangement of components.

Figure 7:
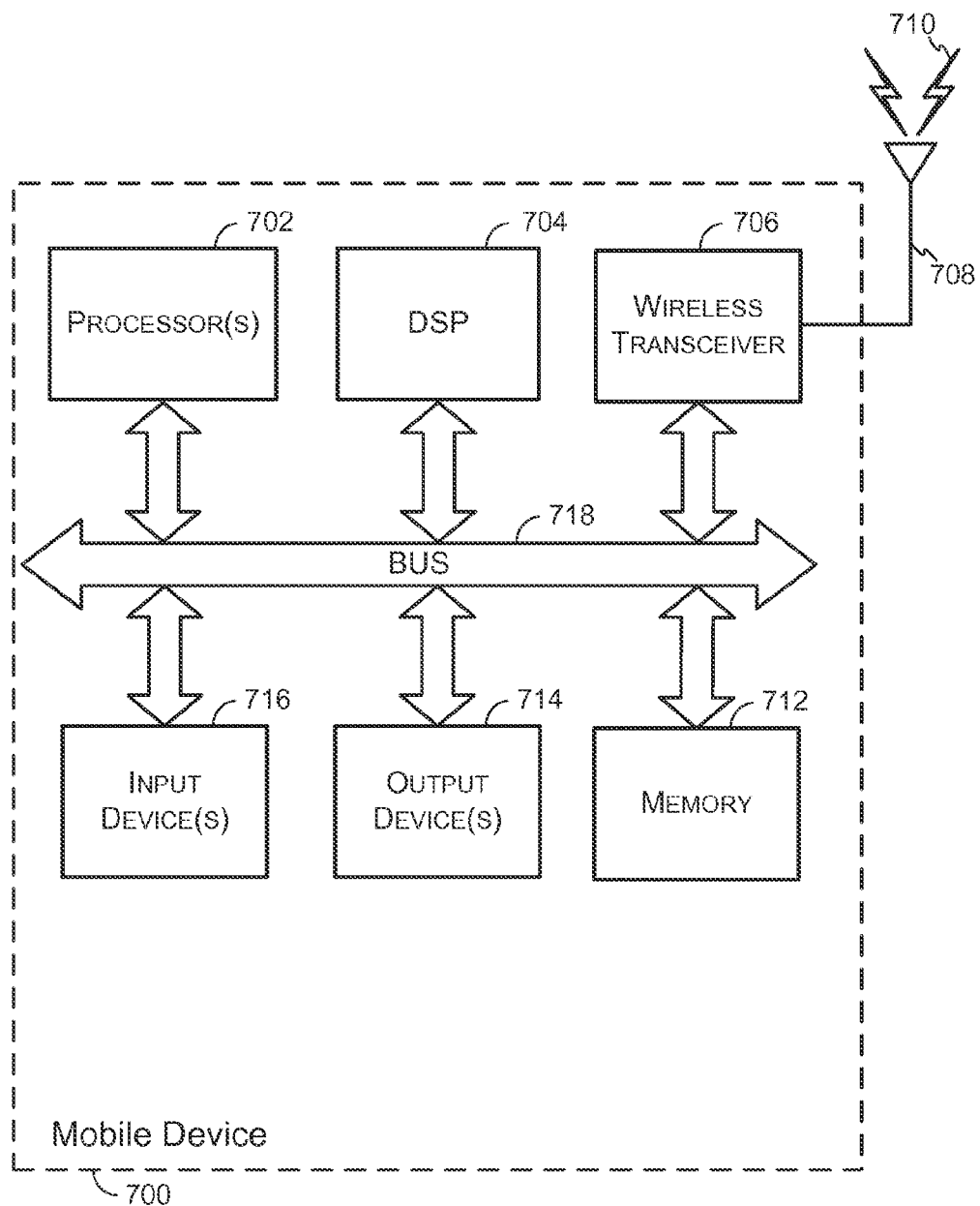
FIG. 7 is a block diagram illustrating an example of a mobile device, in accordance with some embodiments.

FIG. 7 illustrates an example of a mobile device 700. The mobile device 700 may be a cellular telephone, a smartphone, a laptop computer, a tablet, a personal digital assistant (PDA), a computing device, or any other mobile device having wireless connection capability. The mobile device 700 includes hardware elements that can be electrically coupled via a bus 718 (or may otherwise be in communication, as appropriate). In one embodiment, the bus 718 can be used for the processor(s) 702 to communicate between cores and/or with the memory 712. The hardware elements may include one or more processors 702, including without limitation one or more general-purpose processors and/or one or more special-purpose processors (such as digital signal processing chips, graphics acceleration processors, and/or the like); one or more input devices 716, which can include without limitation a camera, a mouse, a keyboard, a touch sensitive screen, a touch pad, a keypad, and/or the like; and one or more output devices 714, which can include, without limitation, a display, a printer, and/or the like.

The mobile device 700 may include one or more wireless transceivers 706 connected to the bus 718. The wireless transceiver 706 may be operable to receive a wireless signal 710 via antenna 708. The wireless signal 710 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 706 may be configured to receive various radio frequency (RF) signals 710 via antenna 708 from one or more gateways, network devices, cloud networks, and/or the like. Mobile device 700 may also be configured to decode and/or decrypt, via the DSP 704 and/or processor(s) 702, various signals received from one or more gateways, network devices, cloud networks, and/or the like.

The mobile device 700 may further include (and/or be in communication with) one or more non-transitory machine-readable storage mediums or storage devices (e.g., memory 712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 712, such as RAM, ROM, FLASH, or disc drive, and executed by processor(s) 702 or DSP 704. The mobile device 700 can also comprise software elements (e.g., located within the memory 712), including, for example, an operating system, device drivers, executable libraries, and/or other code, such as one or more application programs, which may comprise computer programs implementing various functions. Memory 712 may be a non-transitory machine-readable storage medium, processor-readable memory, and/or a computer-readable memory that stores the one or more computer-program products configured to cause the processor(s) 702 and/or DSP 704 to perform the various functions. In other embodiments, the various functions described may be performed in hardware.

Figure 8:
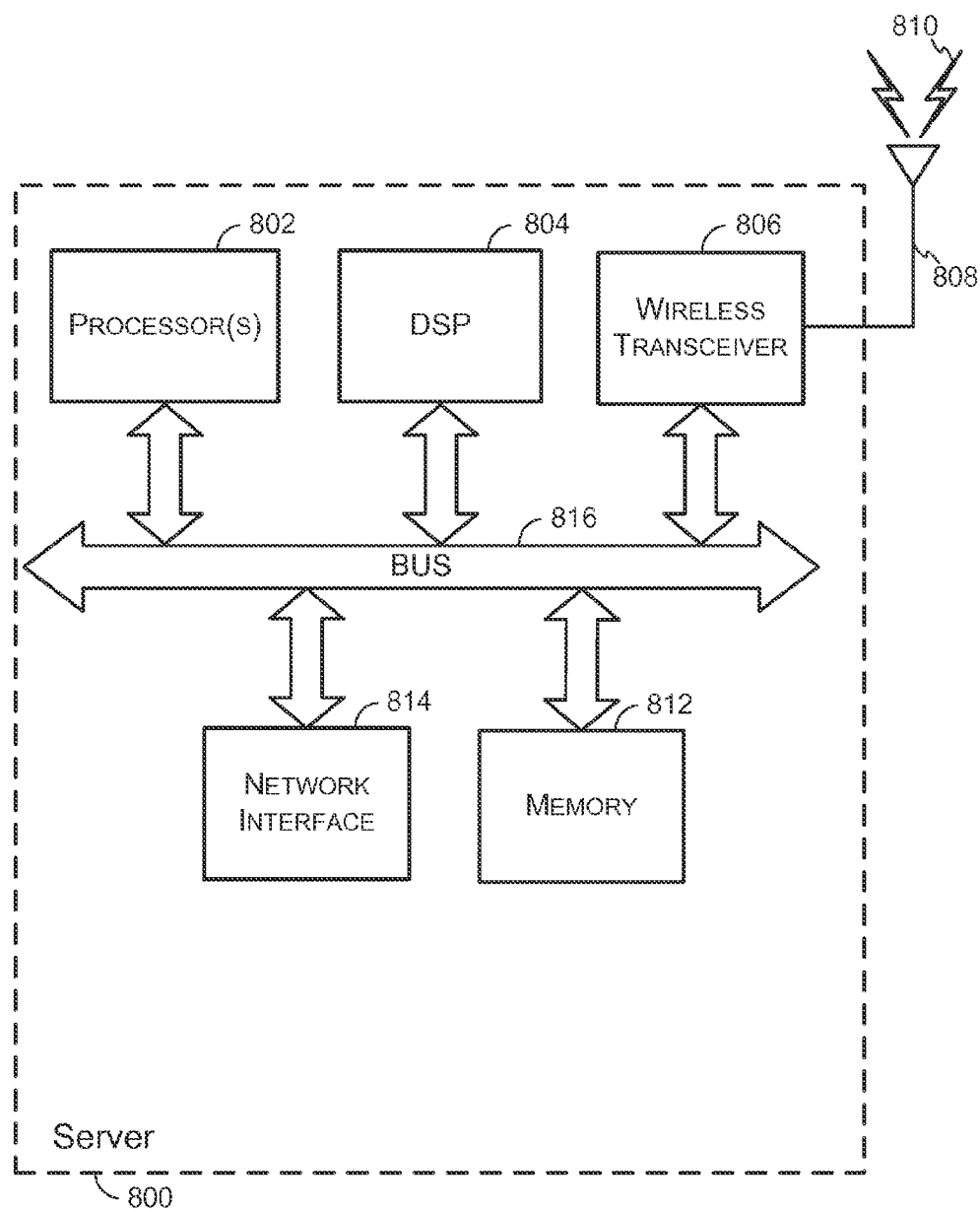
FIG. 8 is a block diagram illustrating an example of a server, in accordance with some embodiments.

FIG. 8 illustrates an example of a server 800. The server 800 includes hardware elements that can be electrically coupled via a bus 816 (or may otherwise be in communication, as appropriate). In one embodiment, the bus 816 can be used for the processor(s) 802 to communicate between cores and/or with the memory 812. The hardware elements may include one or more processors 802, including without limitation one or more general-purpose processors and/or one or more special-purpose processors (such as digital signal processing chips, graphics acceleration processors, and/or the like), memory 812, DSP 804, a wireless transceiver 806, a bus 816, and antenna 808. Furthermore, in addition to the wireless transceiver 806, server 800 can further include a network interface 814 to communicate with a network (e.g., a local area network, a network of a preferred carrier, Internet, etc.).

The server 800 may further include (and/or be in communication with) one or more non-transitory machine-readable storage mediums or storage devices (e.g., memory 812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 812. The server 800 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 2 and 4, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2 and 4. The memory 812 may be a non-transitory machine-readable storage medium, processor-readable memory, and/or a computer-readable memory that stores the one or more computer-program products configured to cause the processor(s) 802 to perform the functions described. In other embodiments, one or more of the functions described may be performed in hardware.

A set of these instructions and/or code might be stored on a non-transitory machine-readable storage medium, such as the memory 812. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 800 and/or might take the form of source and/or installable code, which, upon compilation and/or installation on the server 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other mobile or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
  transmitting, on a network device, a query, wherein the query includes a request for identifying a primary gateway in a local area network, wherein the primary gateway provides devices connected to the local area network with access to a wide area network, wherein access to the local area network is provided to one or more network devices by multiple gateway devices, and wherein the multiple gateway devices include the primary gateway;
  receiving a response to the query, wherein the response includes an identifier associated with the primary gateway;
  transmitting credentials of the primary gateway, wherein the credentials include the identifier associated with the primary gateway, wherein the credentials are used to associate the network device with a single logical network in the local area network, wherein the primary gateway is registered as the single logical network using the credentials, wherein a network identifier is assigned to the single logical network, wherein a mobile device registered with the single logical network is provided with access to network devices associated with the local area network, and wherein the mobile device is limited to connecting to network devices associated with one logical network at a time; and receiving the network identifier, wherein the network identifier associates the network device with the single logical network, and wherein the network identifier facilitates connection of the mobile device with the network devices.

2. The method of claim 1, wherein when the query is transmitted to the primary gateway, the response is received from the primary gateway.

3. The method of claim 1, wherein when the query is transmitted to a gateway that is not the primary gateway, the query is forwarded to the primary gateway and the response is generated by the primary gateway.

4. The method of claim 1, wherein the query includes an address resolution protocol command.

5. The method of claim 4, wherein the address resolution protocol command includes an Internet protocol address of the primary gateway.

6. The method of claim 1, wherein the identifier associated with the primary gateway includes a media access control address of the primary gateway.

7. The method of claim 1, wherein the query includes a reflection service request.

8. The method of claim 1, wherein the credentials of the primary gateway include the identifier and a service set identification associated with the local area network, and wherein the identifier includes a media access control address of the primary gateway.

9. The method of claim 1, wherein the local area network includes a home automation network.

10. A network device, comprising:
one or more data processors; and
a non-transitory computer-readable storage medium containing instructions which when executed on the one or more data processors, cause the one or more processors to perform operations including:
  transmitting a query, wherein the query includes a request for identifying a primary gateway in a local area network, wherein the primary gateway provides devices connected to the local area network with access to a wide area network, wherein access to the local area network is provided to one or more network devices by multiple gateway devices, and wherein the multiple gateway devices include the primary gateway;
  receiving a response to the query, wherein the response includes an identifier associated with the primary gateway;
  transmitting credentials of the primary gateway, wherein the credentials include the identifier associated with the primary gateway, wherein the credentials are used to associate the network device with a single logical network in the local area network, wherein the primary gateway is registered as the single logical network using the credentials, wherein a network identifier is assigned to the single logical network, wherein a mobile device registered with the single logical network is provided with access to network devices associated with the local area network, and wherein the mobile device is limited to connecting to network devices associated with one logical network at a time; and
  receiving the network identifier, wherein the network identifier associates the network device with the single logical network, and wherein the network identifier facilitates connection of the mobile device with the network devices.

11. The network device of claim 10, wherein when the query is transmitted to the primary gateway, the response is received from the primary gateway.

12. The network device of claim 10, wherein when the query is transmitted to a gateway that is not the primary gateway, the query is forwarded to the primary gateway and the response is generated by the primary gateway.

13. The network device of claim 10, wherein the query includes an address resolution protocol command.

14. The network device of claim 13, wherein the address resolution protocol command includes an Internet protocol address of the primary gateway.

15. The network device of claim 10, wherein the identifier associated with the primary gateway includes a media access control address of the primary gateway.

16. The network device of claim 10, wherein the query includes a reflection service request.

17. The network device of claim 10, wherein the credentials of the primary gateway include the identifier and a service set identification associated with the local area network, and wherein the identifier includes a media access control address of the primary gateway.

18. A computer-program product tangibly embodied in a non-transitory machine-readable storage medium of a network device, including instructions configured to cause one or more data processors to:
  transmit a query, wherein the query includes a request for identifying a primary gateway in a local area network, wherein the primary gateway provides devices connected to the local area network with access to a wide area network, wherein access to the local area network is provided to one or more network devices by multiple gateway devices, and wherein the multiple gateway devices include the primary gateway;
  receive a response to the query, wherein the response includes an identifier associated with the primary gateway;
  transmit credentials of the primary gateway, wherein the credentials include the identifier associated with the primary gateway, wherein the credentials are used to associate the network device with a single logical network in the local area network, wherein the primary gateway is registered as the single logical network using the credentials, wherein a network identifier is assigned to the single logical network, wherein a mobile device registered with the single logical network is provided with access to network devices associated with the local area network, and wherein the mobile device is limited to connecting to network devices associated with one logical network at a time; and
  receive the network identifier, wherein the network identifier associates the network device with the single logical network, and wherein the network identifier facilitates connection of the mobile device with the network devices.

19. The computer-program product of claim 18, wherein the query includes an address resolution protocol command.

20. The computer-program product of claim 19, wherein the address resolution protocol command includes an Internet protocol address of the primary gateway.

* * * * *